United States Patent [19]
Ida

[11] Patent Number: 5,216,816
[45] Date of Patent: Jun. 8, 1993

[54] COMPASS

[75] Inventor: Yasushi Ida, Tokyo, Japan

[73] Assignee: Casio Computer Co., Ltd., Tokyo, Japan

[21] Appl. No.: 666,344

[22] Filed: Mar. 8, 1991

[30] Foreign Application Priority Data

Mar. 20, 1990 [JP] Japan ............... 2-28378[U]
Apr. 5, 1990 [JP] Japan ............... 2-36870[U]

[51] Int. Cl.⁵ ............................................. G01C 17/38
[52] U.S. Cl. ........................................ 33/356; 368/14; 364/559
[58] Field of Search ........... 33/356, 357; 368/10, 368/14, 20; 364/457, 559, 571.04

[56] References Cited

U.S. PATENT DOCUMENTS

| | | | |
|---|---|---|---|
| 4,024,382 | 5/1977 | Fowler | 33/356 |
| 4,031,630 | 6/1977 | Fowler | 33/356 |
| 4,055,902 | 11/1977 | Jolley et al. | 33/356 |
| 4,091,543 | 5/1978 | Lapeyre | 33/356 |
| 4,336,596 | 6/1982 | Martin | 33/356 |
| 4,470,119 | 9/1984 | Hasebe et al. | |
| 4,482,255 | 11/1984 | Gygax et al. | |
| 4,668,100 | 5/1987 | Murukami et al. | |
| 4,694,583 | 9/1987 | Blaney | |
| 4,726,687 | 2/1988 | Gander | |
| 4,791,729 | 12/1988 | Suda | |
| 4,887,081 | 12/1989 | Lihoshi et al. | 33/356 |

FOREIGN PATENT DOCUMENTS

| | | |
|---|---|---|
| 0069965 | 1/1983 | European Pat. Off. |
| 0078510 | 5/1983 | European Pat. Off. |
| 0280546 | 8/1988 | European Pat. Off. |
| 3224633 | 1/1983 | Fed. Rep. of Germany |
| 53-131714 | 10/1980 | Japan |
| 58-135412 | 8/1983 | Japan |
| 62-130310 | 6/1987 | Japan |
| 62-130311 | 6/1987 | Japan |
| 63-36185 | 2/1988 | Japan |
| WO85/05444 | 12/1985 | PCT Int'l Appl. |
| 613832 | 10/1979 | Switzerland |
| 2081910 | 2/1982 | United Kingdom |

Primary Examiner—Thomas B. Will
Attorney, Agent, or Firm—Frishauf, Holtz, Goodman & Woodward

[57] ABSTRACT

In a compass, the direction of the geomagnetism is detected by magnetic sensors and an azimuth detector, and data on the direction of the geomagnetism is supplied to a controller. A ROM stores declination data representing the angle formed between the direction of the geomagnetism and the direction of the geographic meridian. The data on the direction of the geomagnetism is corrected in accordance with the declination data stored in the ROM, to thereby obtain geographical direction data. This geographical direction data is displayed on a display device. In this manner, the compass enables the user to easily know a true direction.

13 Claims, 19 Drawing Sheets

COMPASS

BACKGROUND OF THE INVENTION

1. Field of the Invention

The present invention relates to a compass, wherein a magnetic sensor derives azimuthal data from the geomagnetism it detects, and an azimuth determined on the basis of the azimuthal data is optically displayed.

2. Description of the Related Art

As a device for determining an azimuth, a magnetic compass is well known. This magnetic compass comprises a magnetic needle which is free to pivot and which moves in response to the geomagnetism until its one end points to the geomagnetic North Pole. An electronic compass is also well known. This electronic compass comprises a pair of magnetic sensors which are formed by magnetic resistor elements, Hall elements, or the like and are arranged perpendicular to each other. Each magnetic sensor produces a voltage in response to the geomagnetism it detects, and on the basis of this voltage, a geographic direction is determined and displayed on a display device.

With the above magnetic compass and electronic compass, however, it is impossible to know the true "north" direction since the azimuth determined by the conventional compasses is based on the data indicating the geomagnetic North Pole. In other words, the above compasses are merely useful in roughly determining the north direction. It should be noted that the relationships between the true south-to-north direction and the direction of the geomagnetism differs, depending upon geographic locations on the globe. In order to know the true azimuth, therefore, an azimuth based on the geomagnetism has to be first determined by use of the above compasses, and then the azimuth, thus determined, has to be corrected in accordance with its deviation from the true north. Such procedures are very troublesome in practice.

SUMMARY OF THE INVENTION

The present invention has been developed in consideration of the above circumstances, and its object is to provide a compass capable of indicating a true azimuth easily and quickly.

To achieve this object, the present invention provides a compass comprising:

declination data storage means for storing declination data which represents the geomagnetism regarding a predetermined location on the earth;

geomagnetism-detecting means for detecting the direction of the geomagnetism and deriving azimuthal data therefrom;

correction means for correcting the azimuthal data in accordance with the declination data, to thereby obtain corrected azimuthal data; and display means for displaying the corrected azimuthal data.

The compass of the present invention employs magnetic sensors, but allows the user to readily know a true direction since the declination angle of the geomagnetism detected by the magnetic sensors is corrected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The first embodiment of the present invention will now be described, with reference to FIG. 1 through FIG. 10B of the accompanying drawings.

Figure 1:
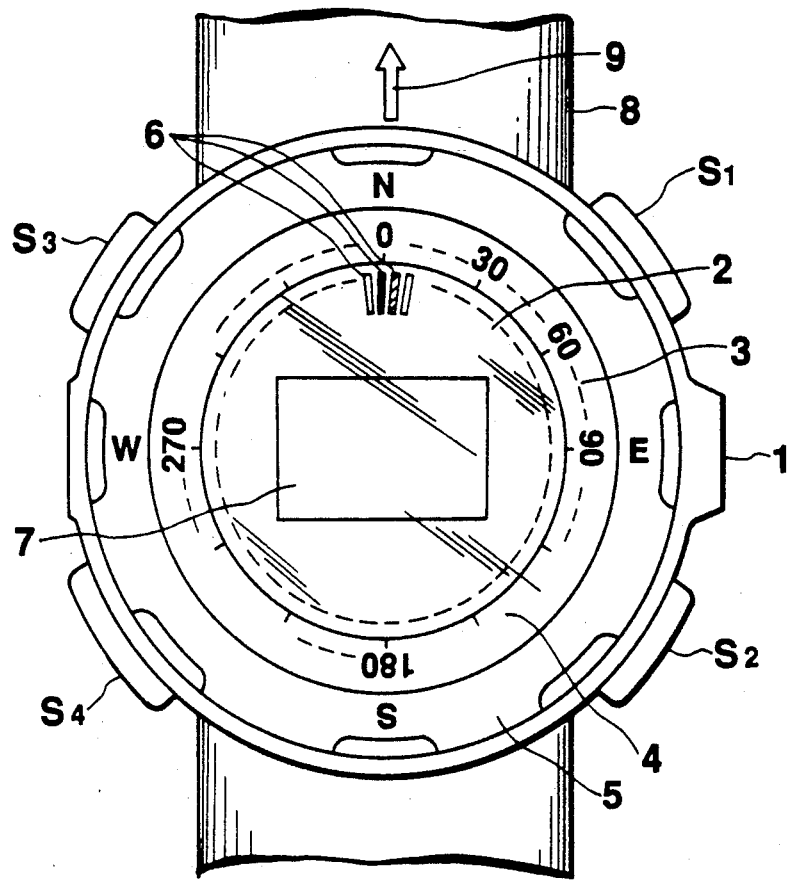
FIG. 1 shows an outward appearance of an electronic wristwatch in which a compass according to the present invention is incorporated.

FIG. 1 shows an outward appearance of an electronic wristwatch in which a compass according to the present invention is incorporated. As is shown in FIG. 1, the electronic wristwatch comprises a main body 1, a circular liquid crystal display section 2 located in the center of the front portion of the main body 1, an annular dial 3 (face) located around the liquid crystal display section 2, a glass cover 4 which covers both the liquid crystal display 2 and the dial 3, and a bezel 5 located around the glass cover 4.

A plurality of display elements (the number of which is 120, for example), used for indicating an azimuth or a direction, are arranged at equal intervals in the circumferential region of the liquid crystal display section 2. A dot matrix display 7, used for indicating an azimuth or time, is provided in the center of the liquid crystal display section 2, such that the longitudinal ends of the dot matrix display 7 are at the three-o'clock position and the nine-o'clock position, respectively. Azimuth marks are printed on the dial 3 clockwise. More specifically, azimuth angles are printed on the dial 3, together with divisions, such that "0" is at the twelve-o'clock position, "30" is at the one-o'clock position, "60" is at the two-o'clock position, "90" is at the three-o'clock position, and in like manner.

Direction-pointing symbols "N", "E", "S" and "W" are printed on the bezel 5, such that "N" is at the twelve-o'clock position, "E" is at the three-o'clock position, "S" is at the six-o'clock position, and "W" is at the nine-o'clock position. Four switches S1, S2, S3 and S4, used for switching display modes from one to another and for entering data on the latitude, longitude, etc, are located on the circumference of the main body 1. A band 8 is attached to the main body 1, and arrow 9 pointing to the twelve-o'clock direction is printed on the band 8.

Figure 2:
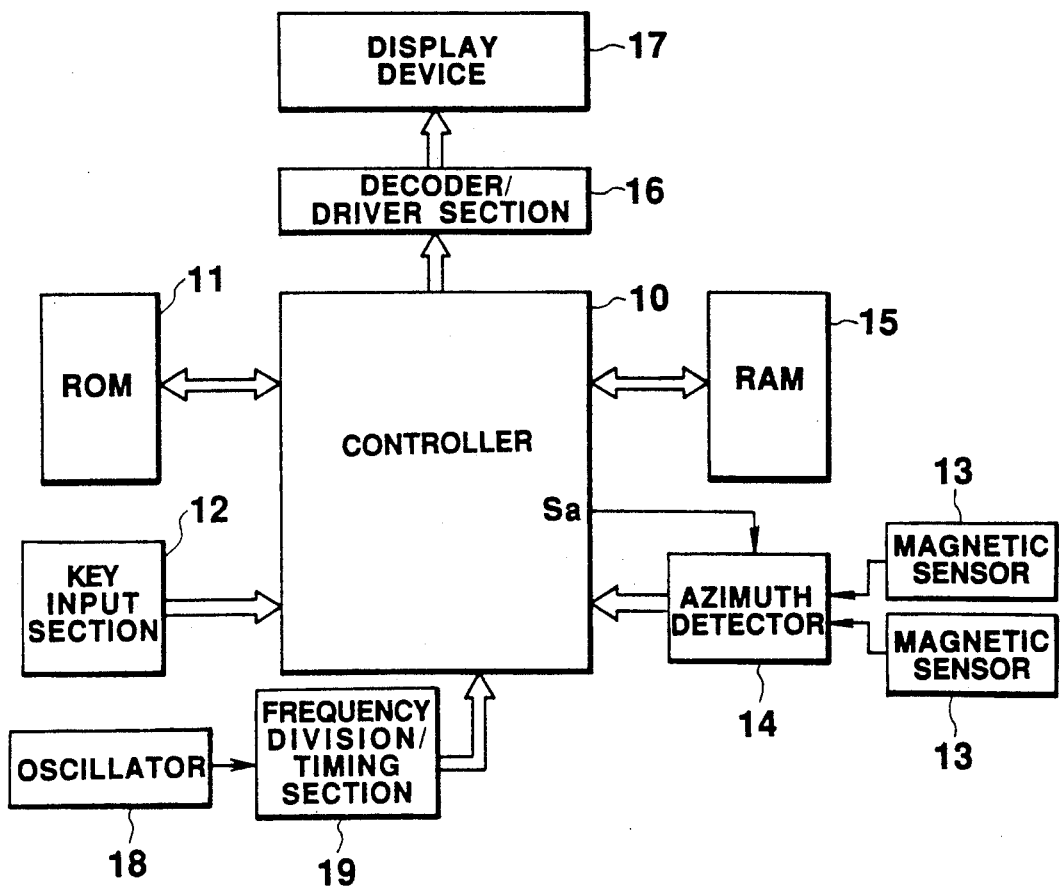
FIG. 2 is a block circuit diagram illustrating the internal circuit of the electronic wristwatch shown in FIG. 1.

FIG. 2 is a block circuit diagram illustrating the internal circuit of the electronic wristwatch shown in FIG. 1.

Referring to FIG. 2, a ROM (a read-only memory) 11 stores a microprogram with which to control the system, numeric data used for various arithmetic operations, and a declination data table (to be mentioned later). A key input section 12 is provided with the four switches S1–S4 shown in FIG. 1, and supplies signals entered through the switches S1–S4 to a controller 10. This controller 10 is a CPU, such as a microprocessor, and controls the entire system on the basis of the program stored in the ROM 11. When a signal commanding the display of an azimuth is supplied from the key input section 12, the controller 10 outputs signal Sa to actuate an azimuth detector 14 (which will be mentioned later). The controller 10 further executes time-measuring processing on the basis of a time measurement timing signal supplied from a frequency division/timing section 19.

A pair of magnetic sensors 13 ar provided. These magnetic sensors 13 are made by magnetic resistor elements, have the same characteristics, and are arranged perpendicular to each other. The magnetic sensors 13 sense geomagnetic components and supply voltages corresponding to the sensed geomagnetic components to the azimuth detector 14. This azimuth detector 14 is actuated in response to signal Sa supplied from the controller 10, and carries out a vector operation in accordance with the magnitudes of the voltages supplied from the magnetic sensors 13. On the basis of the result of this vector operation and of the direction in which the magnetic sensors 13 are arranged, the azimuth detector 14 produces azimuthal data indicating the geomagnetic North Pole and supplies the azimuthal data to the controller 10. As will be mentioned later, the azimuthal data is used for obtaining data representing the true azimuth.

An oscillator 18 generates a clock signal of a predetermined period and supplies the clock signal to the frequency division/timing section 19. This frequency division/timing section 19 is made up of a frequency-dividing circuit and a timing generator, and supplies a time measurement timing signal and a timing signal (with which to control the sections of the wristwatch in a time series manner) to the controller 10.

A RAM (random access memory) 15 is made up of registers for storing predetermined data, as is shown in FIG. 3β.

A decoder/driver section 16 is supplied with signals from the controller 10. After decoding the combination of the signals, the decoder/driver section 16 supplies the signals to a display device 17. This display device 17 is provided with the liquid crystal display section 2 shown in FIG. 1, and causes the display elements 6 and the dot matrix display 7 to indicate the data corresponding to the signals supplied from the decoder/driver section 16.

Figure 3A:
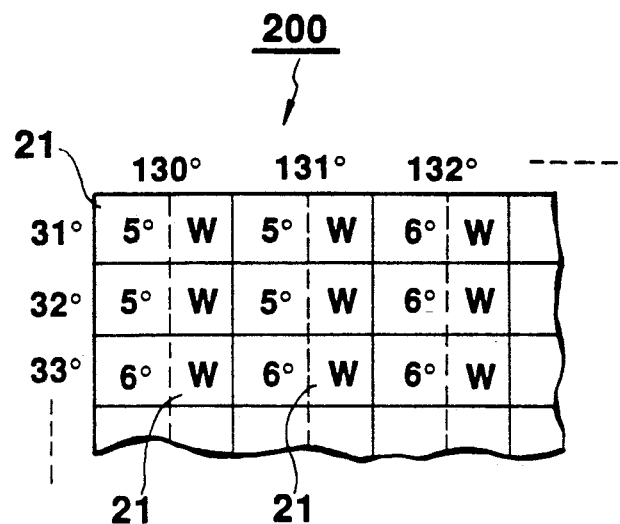
FIG. 3A shows the configuration of the declination data table which is stored in part of the ROM shown in FIG. 2.

FIG. 3A shows part of the declination data table 200 which is stored in the ROM 11. The declination data table 200 contains declination data 21 corresponding to a large number of geographical points on the globe, i.e., data indicating what angle is formed between the direction of the geomagnetism and the direction of the geographic meridian at each geographical point. As is shown in FIG. 3A, each declination data 21 is made up of two data pieces, one representing the angle of declination and the other representing the direction of declination. Pieces of the declination data 21 are arranged in a matrix pattern, such that the pieces corresponding to the same geographical latitude are arrayed in the row direction and the pieces corresponding to the same geographical longitude are arrayed in the column direction. For example, that declination data 21 which is shown at the upper left end in FIG. 3A corresponds to a point whose geographical latitude is 31° and whose geographical longitude is 130°, and the angle of declination at that point is 5° and the direction of declination at that point is the west direction.

Figure 3B:
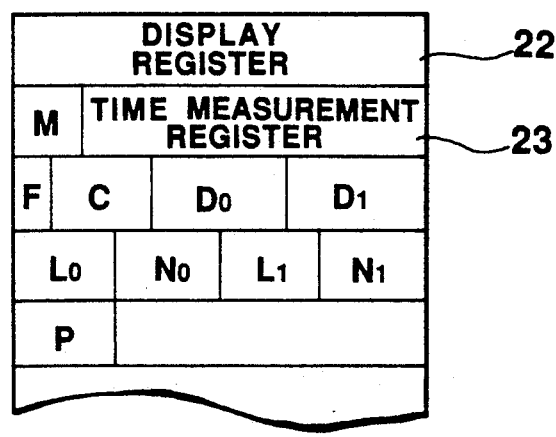
FIG. 3B shows the configuration of the major portions of the RAM shown in FIG. 2.

FIG. 3B shows the configuration of the major portions of the RAM 15. Referring to FIG. 3B, a display register 22 stores data which is to be indicated with the display elements 6 shown in FIG. 1 and data which is to be shown on the dot matrix display 7.

A time measurement register 23 stores data on the present time which is determined on the basis of the time measurement timing signal supplied from the frequency division/timing section 19. Register M is a mode flag which takes one of three values "0", "1" and "2" corresponding to the three display modes (namely, a time display mode, an azimuth I display mode, and an azimuth II display mode), respectively.

Register F is a flag which takes value "1" when the wristwatch is in a mode for adjusting the time or for setting data on the latitude or longitude. Register C is stores data on a value with which to adjust data. Registers D0 and D1 store data representing that geographical point on the globe at which the wristwatch is used. More specifically, register D0 stores geographical longitude data entered beforehand, and register D1 stores geographical latitude data also entered beforehand.

Register N0 stores azimuthal data which is produced by the azimuth detector 14 and which indicates the geomagnetic North Pole. Register L0 stores azimuthal data which is obtained by executing an operation on the basis of the data indicating the geomagnetic North Pole and which corresponds to the twelve-o'clock direction (i.e., the direction indicated by arrow 9 in FIG. 1). Register N1 stores true-north azimuthal data which is obtained by subjecting the data on the geomagnetic North Pole to declination correction. Register L1 stores azimuthal data which is obtained by the declination correction and which corresponds to the twelve-o'clock position. Register P stores declination data read out of the ROM 11.

An operation which is performed under the control of the controller 10 will now be described, with reference to the flowcharts shown in FIGS. 4 and 5.

Figure 4:
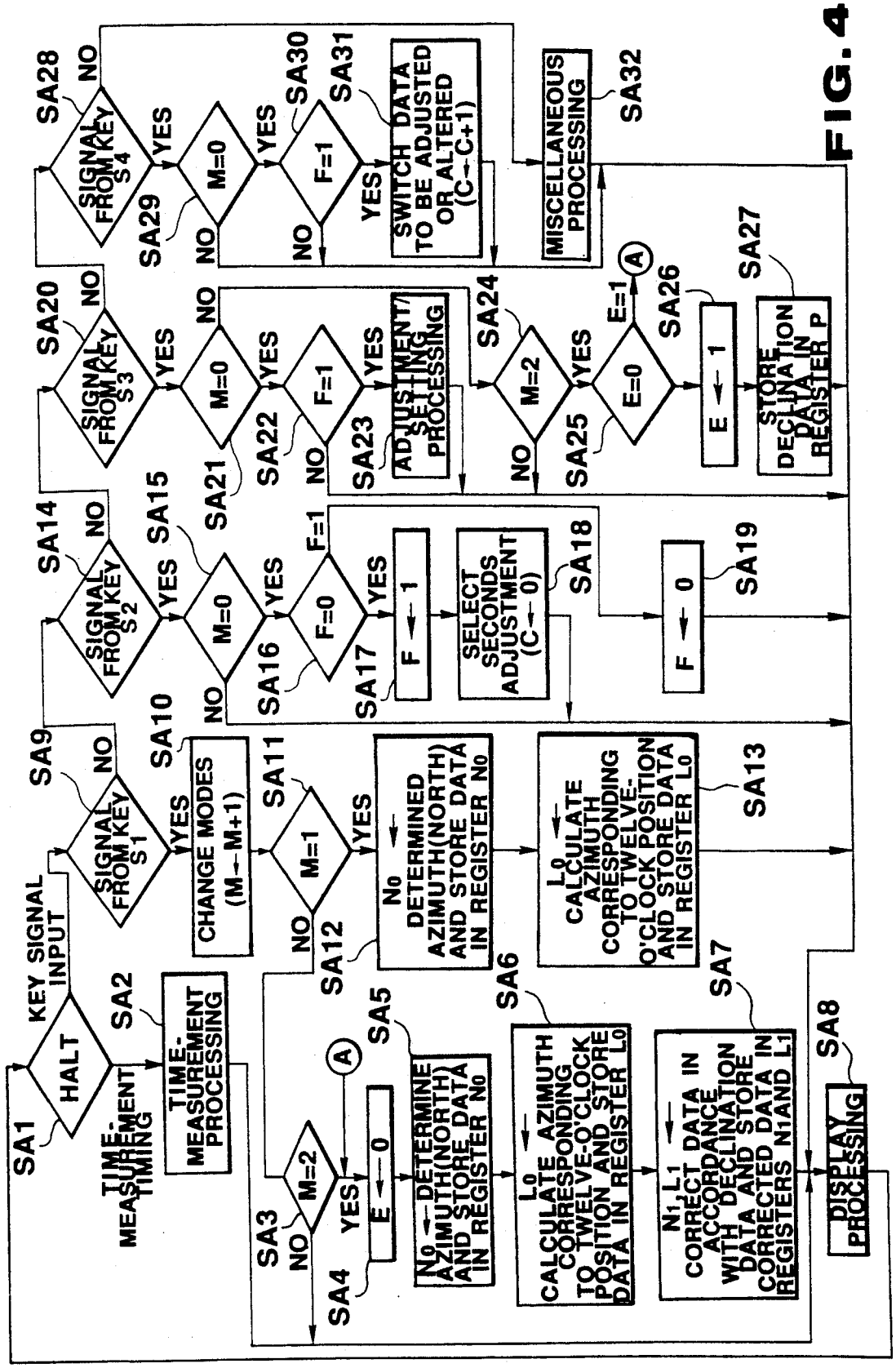
FIG. 4 is a flowchart illustrating the entire program.

FIG. 4 is a flowchart illustrating the entire program. Step SA1 indicates a HALT state. At a time-measurement timing, the flow advances to step SA2. In this step SA2, the controller 10 executes time-measurement processing on the basis of the time measurement timing signal supplied from the frequency division/timing section 19. The present-time data obtained by this processing is stored in the time measurement register 23. Then, the flow advances to step SA8, wherein a predetermined display operation is performed in accordance with the value of register M. After the display operation, the flow returns to step SA1.

If, in step SA1, a key signal is supplied from the key input section 12, then the flow advances to step SA9. In this step SA9, a check is made to see whether or not the signal is a signal entered by means of this switch, the three display modes [namely, a time display mode, an azimuth I display mode, and an azimuth II display mode] are switched from one to another in a cycle.) If it is determined that the signal is entered by switch S1, then the flow advances to step SA10. In this step SA10, "1" is added to the value stored in register M, so as to establish the next mode. After this, the flow advances to step SA11, wherein a check is made to see whether or not the value of register M is "1" corresponding to the azimuth I display mode.

If it is determined in step SA11 that the value of register M is "1", then the flow advances to step SA12. In this step SA12, the controller 10 drives both the magnetic sensors 13 and azimuth detector 14 by outputting signal Sa, to thereby determine the geomagnetic North Pole (hereinafter referred to as an azimuthal north). The data on the azimuthal north is stored in register N0. Then, the flow advances to step SA13, wherein an operation is carried out on the basis of the data stored in register N0. By this operation, the azimuth corresponding to the twelve-o'clock position of the wristwatch is calculated. The data on the azimuth, thus calculated, is stored in register L0. As is understood from this, the data stored in registers N0 and L0 are displayed in step SA8, when the value of register M is "1".

If it is determined in step SA11 that the value of register M is not "1", then the flow advances to step SA3 to check whether or not the value of register M is "2". If the value of register M is "2", this means that the wristwatch is in the azimuth II display mode. In this case, the flow advances to step SA4 wherein "0" is set to register E, and then to step SA5. In step SA5, the controller 10 drives both the magnetic sensors 13 and azimuth detector 14 by outputting a signal Sa, to thereby determine the azimuthal north. The data of the azimuthal north is stored in register N0.

Then, the flow advances to step SA6, wherein an operation is carried out on the basis of the data stored in register N0. By this operation, the azimuth corresponding to the twelve-o'clock position of the wristwatch is calculated. The data on the azimuth, thus calculated, is stored in register L0. Thereafter, the flow advances to step SA7. In this step SA7, the ROM 11 is accessed to read out declination data corresponding to that position on the globe which is represented by the data stored in registers D0 and D1. In accordance with the declination data, the azimuthal north data stored in register N0 is corrected, to thereby obtain data on the true north direction. The data, thus obtained, is stored in register N1. Further, the azimuthal data which is stored in register L0 and corresponds to the twelve-o'clock position of the wristwatch is corrected in accordance with the declination data, and the data obtained by this correction is stored in register L1. In step SA8, which is executed after step SA7, the corrected azimuthal data is displayed after confirming that the value of register M is "2".

If it is determined in step SA3 that the value of register M is not "2", then the flow jumps to step SA8, wherein the present time is displayed.

Figure 6:
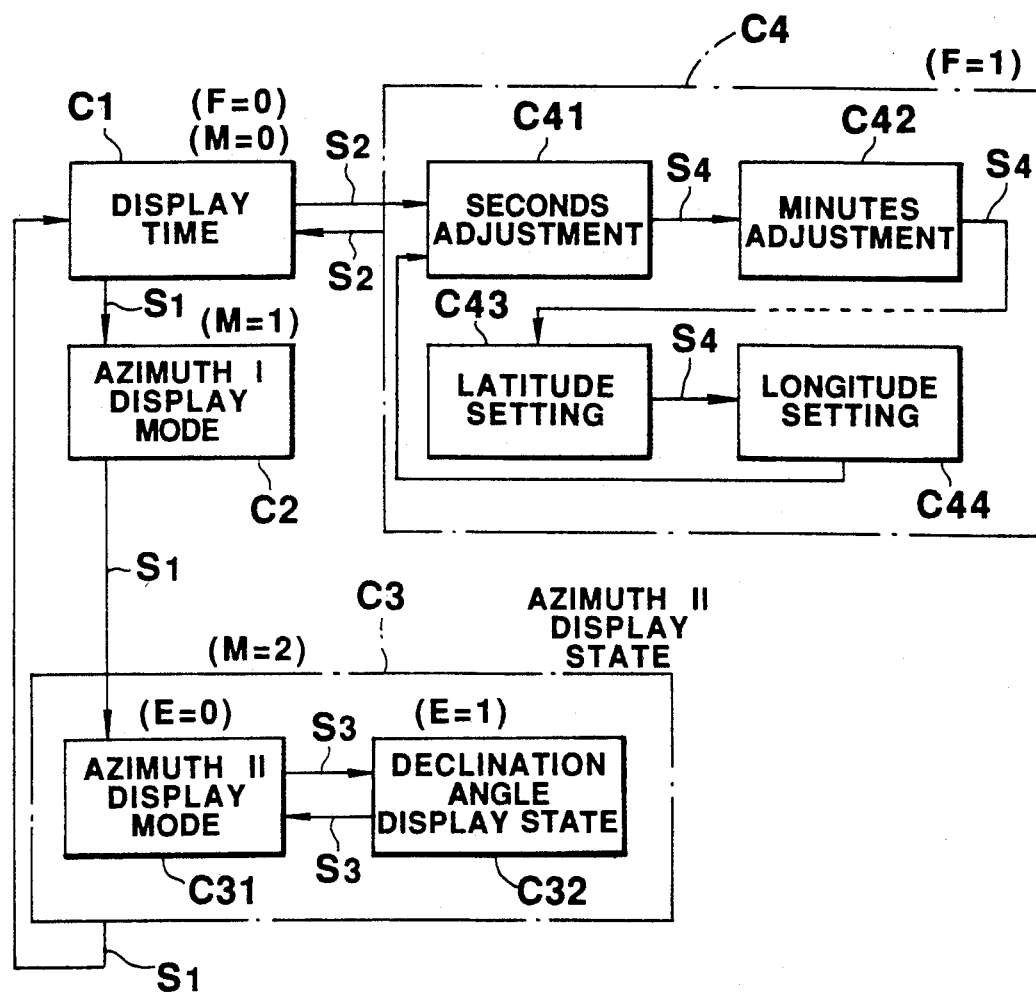
FIG. 6 shows operating modes which can be established one after another in response to a switching operation.
Figure 7:
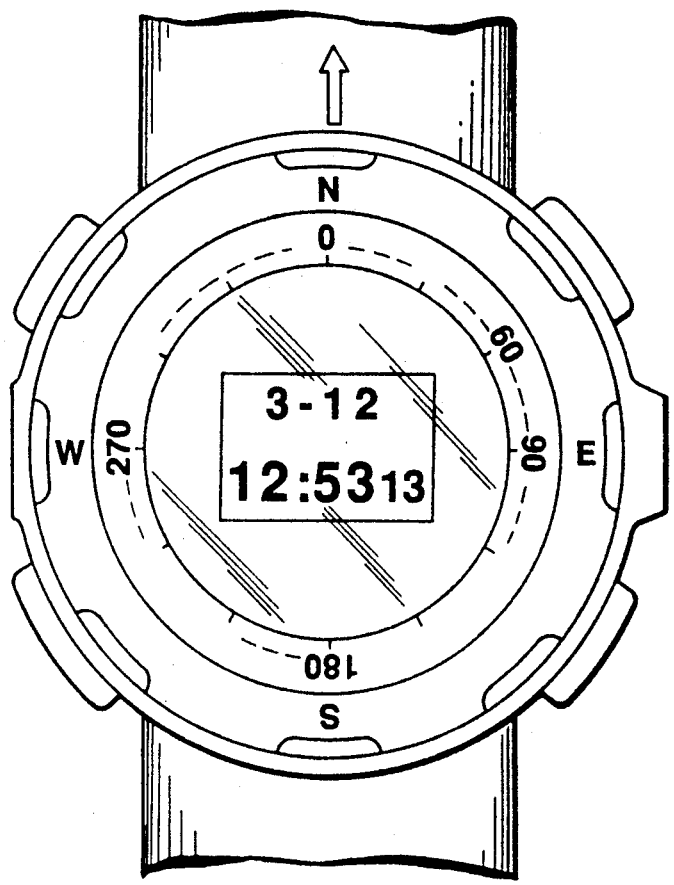
FIG. 7 shows how time is indicated by the wristwatch shown in FIG. 1.

FIG. 6 shows operating modes which can be established one after another in response to the operation of switch S1. In FIG. 6, "C1" denotes a time display mode. When the wristwatch is in this mode, the present time is indicated on the dot matrix display 7. An example of present time indication is shown in FIG. 7, wherein the present time (12:53.13) is indicated together with the present date (the 12th of March).

When switch S1 is operated in the time display mode, "1" added to the value of register M, so that the azimuth I display mode indicated by C2 in FIG. 6 is established in place of the time display mode. In this azimuth I display mode, data on the geomagnetic North Pole and data on the azimuth corresponding to the twelve-o'clock position are stored in registers N0 and L0, respectively, in steps SA12 and SA13 shown in FIG. 4. As is shown FIG. 8, therefore, the display element 6a arranged at the twelve-o'clock position blinks, and the azimuthal data (e.g., "225°") which is stored in register L0 and corresponds to the twelve-o'clock position is shown on the dot matrix display 7. Further, the display element 6b corresponding to the azimuthal north is lit on the basis of the data stored in register N0.

In the case where "225°" is indicated on the dot matrix display 7, the user readily understands that the twelve-o'clock direction of the wristwatch is the direction which is 225° shifted from the azimuthal north (0°). Even if "225°" is not indicated, the user can easily calculate this angle since the display element 6b in the lit state is at the 135° position of the dial 3. That is, the user obtains the angle by subtracting 135° from 360°.

The azimuth marks may be printed on the dial 3 counterclockwise, such that "0" is at the twelve-o'clock position, "30" is at the eleven-o'clock position, "60" is at the 10-o'clock position, "90" is at the nine-o'clock position, and in like manner. In this case, the display element which is lit to indicate the azimuthal north is at the position of the corresponding azimuth angle. Thus, the user readily understands how much the twelve-o'clock direction of the wristwatch is shifted from the azimuthal north.

Figure 8:
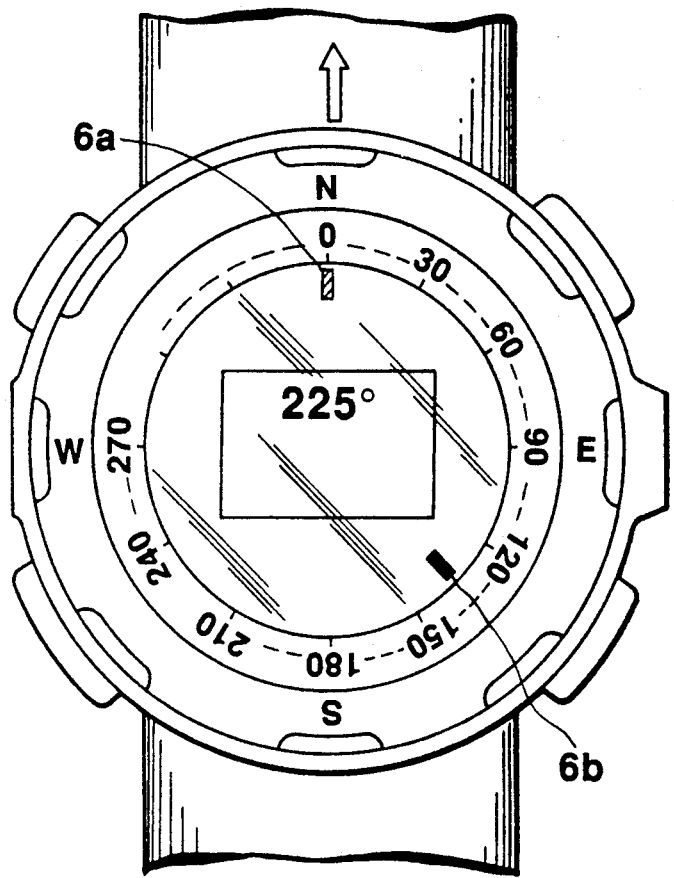
FIG. 8 shows how azimuth I is indicated by the wristwatch shown in FIG. 1.
Figure 9:
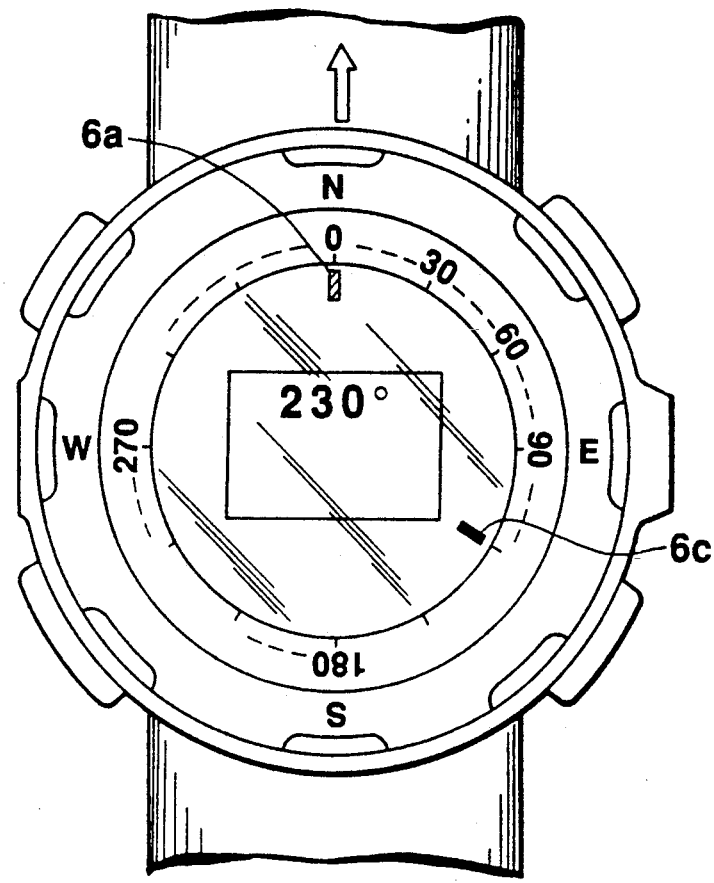
FIG. 9 shows how azimuth II is indicated by the wristwatch shown in FIG. 1.

When switch S1 is operated in the azimuth I display mode mentioned above, "1" is added to the value of register M in step SA10. As a result, the value of register M is changed from "1" to "2", so that the azimuth II display mode indicated by C3 in FIG. 6 is established and the azimuth II display state indicated by C31 is brought about. In this display state, the display element 6b corresponding to the azimuthal north and shown in FIG. 8 is not lit. Instead, the display element 6c corresponding to the true north (the data on which is obtained in step SA7 in FIG. 4) is lit, as is shown in FIG. 9. Further, the azimuthal data (e.g., "225°") corresponding to the twelve-o'clock position is read out of register L0, and is corrected in accordance with the declination data in step SA7 shown in FIG. 4. The corrected azimuthal data (e.g., "230°") is stored in register L1. In the case of the azimuth II display mode, the corrected azimuthal data is read out of register L1 is displayed on the dot matrix display 7, and the corresponding display element 6a blinks. If, in this state, switch S3 (which will be mentioned later) is operated, the declination data (e.g., "5°") used in the correction is displayed on the dot matrix display 7.

When switch S1 is operated in the azimuth II display mode mentioned above, "1" is added to the value of register M. As a result, the value of register M is changed from "2" to "3". However, since register M is reset when its value takes "3", the value of register M is changed from "3" to "0". Accordingly, the wristwatch is returned into the time display mode.

Figure 5:
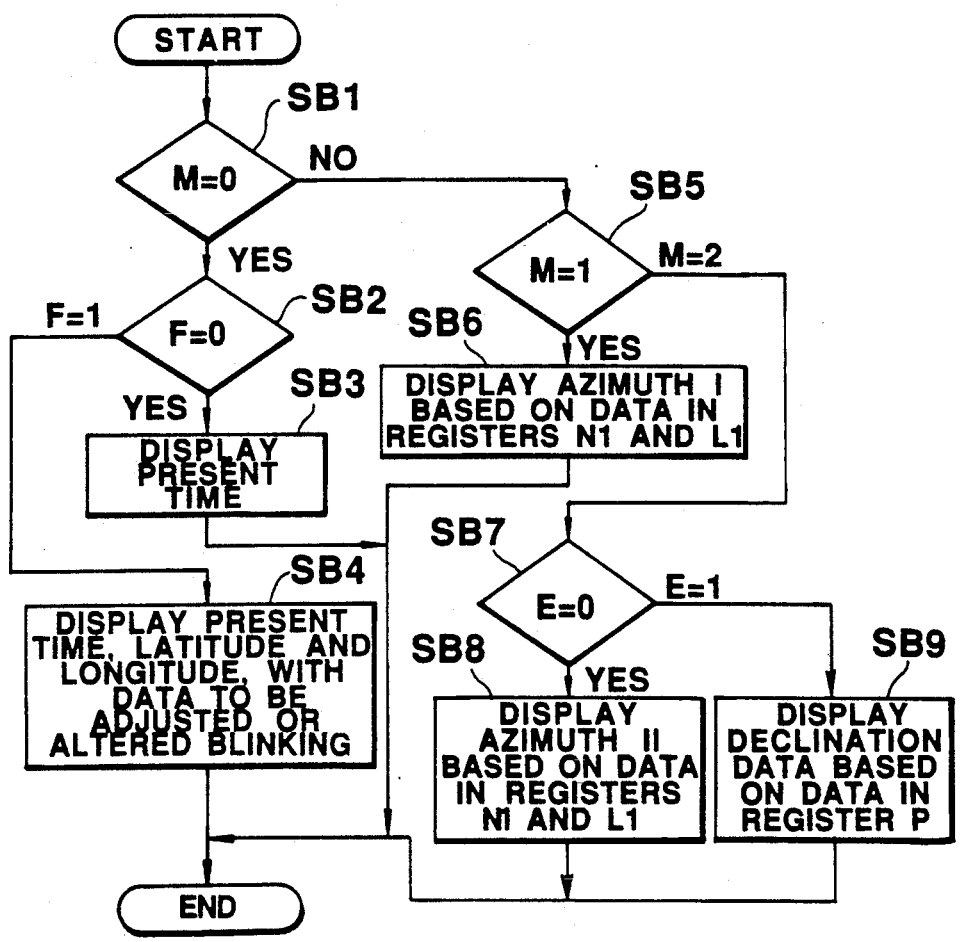
FIG. 5 is a flowchart illustrating a display operation in detail, the display operation corresponding to step SA8 indicated in the flow chart shown in FIG. 4.

The display processing performed in step SA8 will now be detailed, with reference to the flowchart shown in FIG. 5.

Referring to FIG. 5, a check is made in step SB1 to see whether or not the value of register M is "0" (which corresponds to the time display mode). If it is determined that the value of register M is "0", the flow advances to step SB2, so as to check whether or not the value of register F is "0". If it is determined that the value of register F is "0", the flow advances to step SB3. In step SB3, the present time data is read out of the time measurement register 23 of the RAM 15 and is displayed. After this, the display processing is brought to an end.

If it is determined in step SB2 that the value of register F is not "0" but "1", then the flow advances to step SB4. In other words, the adjustment/setting mode which is indicated by C4 in FIG. 6 is established. This adjustment/setting mode is made up of a seconds adjustment mode C41, a minutes adjustment mode C42, a latitude-setting mode C43, and a longitude-setting mode C44. These modes are switched from one to another in response to the operation of switch S4. When the wristwatch is in each of these modes, the data which can be adjusted or altered in response to the operation of switch S3 (which will be mentioned later) blinks. After suitable adjustment or alteration is made by use of switch S3, switch S2 is operated again to bring the wristwatch back into the time display mode.

Turning back to the flowchart shown in FIG. 5, if it is determined in step SB1 that the value of register M is not "0", the flow advances to step SB5. In this step SB5, a check is made to see whether or not he value of register M is "1". If the value of register M is "1", the wristwatch is in the azimuth I display mode. In this case, the flow advances to step SB6, wherein data on the geomagnetic North Pole and data on the azimuth corresponding to the twelve-o'clock position are read out of registers N0 and L0, respectively, and are displayed in a similar manner to that shown in FIG. 8. Thereafter, the display processing is brought to an end.

If it is determined in step SB5 that the value of register M is not "1", it follows that the value is "2". In other words, the wristwatch is in the azimuth II display mode, which was explained above with reference to FIG. 6. In this case, the flow advances to step SB7, so as to check whether or not the value of register E is "0". If the value of register E is "0", the flow advances further to step SB8. In this step SB8, the data which is corrected in accordance with the declination data is read out of registers N1 and L1, for display.

If it is determined in step SB7 that the value of register E is not "0", it follows that the value of register E is "1". In other words, the wristwatch is in the declination data display state indicated by C32 in FIG. 6. In this case, therefore, the flow advances to step SB9, wherein the declination data is read out of register P and is displayed on the dot matrix display 7. Thereafter, the processing is brought to an end.

Turning back to the flowchart shown in FIG. 4, if it is determined in step SA9 that the signal supplied to the controller 10 is not entered by switch S1, then the flow advances to step SA14. In this step SA14, a check is made to see whether or not the signal is entered by switch S2. If it is determined that the signal is entered by switch S2, the flow advances to step SA15, to check whether or not the value of register M is "0". If the value of register M is "0", the wristwatch is either in the time display mode indicated by C1 in FIG. 6 or in the adjustment/setting mode indicated by C4 in FIG. 6. In this case, the flow advances to step SA16. In this step SA16, a check is made to see whether or not the value of register F is "0". If the value of register F is "0", steps SA17 and SA18 are successively executed. Specifically, "1" is set to register F in step SA17, and "0" is set to register C in step SA18. As a result, the seconds adjustment mode C41, which is the first mode involved in the adjustment/setting mode, is established, and the data which can be adjusted or altered in response to the operation of switch S3 is made to blink. Thereafter, the flow advances to step SA8.

If it is determined in step SA16 that the value of register F is not "0", it follows that the value of that register F is "1". In this case, the flow jumps first to step SA19, wherein "0" is set to register F, and then advances to step SA8. If it is determined in step SA15 that the value of register M is not "0", then the signal entered by switch S2 is treated as being invalid, and the flow advances quickly to step SA8. After performing predetermined display processing in step SA8, the flow returns to step SA1.

If it is determined in step SA14 that the signal supplied to the controller 10 is not entered from switch S2, then step SA20 is executed, so as to check whether or not the signal is entered by switch S3. If it is determined in step SA20 that the signal is entered by switch S3, the flow advances to step SA21, wherein a check is made to see whether or not the value of register M is "0". If the value of register M is "0", then the flow advances to step SA22, wherein a check is made to see whether or not the value of register F is "1". If the value of register F is "1", it follows that the wristwatch is in the adjustment/setting mode indicated by C4 in FIG. 6. In this case, therefore, the flow advances to step SA23, wherein the time is adjusted or the latitude and longitude data is set. Thereafter, step SA8 is executed, so as to display the adjusted time or the set or altered latitude and longitude data. If it is determined that the value of register F is not "1", the signal entered by switch is treated as being invalid.

If it is determined in step SA21 that the value of register M is not "0", the flow advances to step SA24, so as to check whether or not the value of register M is "2". If the value of register M is "2", the flow advances to step SA25. In this step SA25, a check is made to see whether or not the value of register E is "0", to thereby determine whether or not the wristwatch is in the azimuth II display mode indicated by C31 in FIG. 6. If the value of register E is "0", this means that switch S has been operated when the wristwatch is in the azimuth II display state. Therefore, steps SA26 and SA27 are successively carried out. In step SA26, "1" is set to register E, so as to switch the wristwatch from the azimuth II display state to the declination data display state indicated by C32 in FIG. 6. In step SA27, the longitude data and latitude data are read out from registers D0 and D1, respectively, and the declination data corresponding to them is read out of the declination data table of the ROM 11. The declination data, thus read out, is stored in register P. This declination data is displayed in step SA8 to be executed thereafter. If it is determined in step SA25 that the value of register E is not "0", this means that switch S3 is operated when the wristwatch is in the declination data display state. In this case, therefore, the flow advances to step SA4, so as to switch the wristwatch from the declination data display state to the azimuth II display state.

If it is determined in step SA20 that the signal is not entered by switch S3, the flow jumps to step SA28, to determine whether or not the signal is entered by switch S4. If the signal is entered by switch S4, it switches the display modes involved in the adjustment/setting mode C4 from one to another. In this case, therefore, the flow advances to step SA29, wherein a check is made to see whether or not the value of register M is "0". If the value of register M is "0", the flow advances further to step SA30, wherein a check is made to see whether or not the value of register F is "1". If the value of register F is "1", this means that the wristwatch is in the adjustment/setting mode indicated by C4 in FIG. 6. Thus, the flow advances to step SA31, wherein "1" is added to the value of register C to thereby make suitable adjustment or alteration in the adjustment/setting mode. Thereafter, the flow returns to step SA1.

If it is determined in step SA28 that the signal supplied to the controller 10 is not a signal entered by switch S4, the flow jumps to step SA32. In this step SA32, modes such as an alarm mode and a stopwatch mode are established or canceled.

If it is determined in step SA29 that the value of register M is not "0", the signal entered by switch S4 is treated as being invalid and the flow advances to step SA8. Likewise, if it is determined in step SA30 that the value of register F is not "1", the signal entered by switch S4 is treated as being invalid and the flow advances to step SA8. In these cases, the flow returns to step SA1 after the predetermined display processing is performed in step SA8.

According to the first embodiment mentioned above, positional information (namely, latitude data and longitude data) are entered to the wristwatch in accordance with the position where the wristwatch is used. With the positional information being entered beforehand, the wristwatch can promptly determine and display the true north direction and the correct azimuth corresponding to the twelve-o'clock position.

In the above description of the embodiment, reference was made to the case where the present invention is applied to an electronic wristwatch. However, the present invention may be embodied simply as a compass, i.e., direction-determining device. Further, the compass may be incorporated in a small electronic device such as an electronic notebook or an electronic scheduler, or in a vehicle such as an automobile or a bicycle.

In the above embodiment, the display elements 6 are arranged only in the circumferential region of the liquid crystal display section 2. However, they may be arranged in the entire liquid crystal display section 2, so as to indicate every data.

Figure 10A:
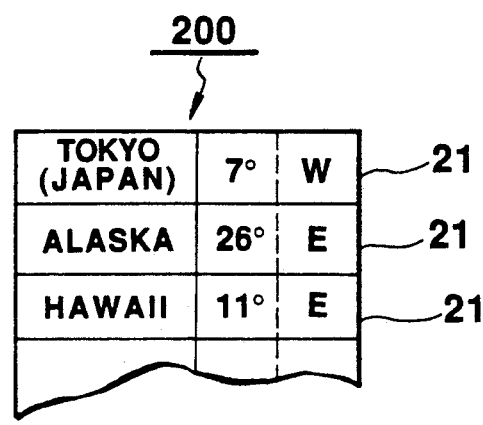
FIG. 10A shows an example of a declination data table which can be used in place of the declination data table shown in FIG. 3A.
Figure 10B:
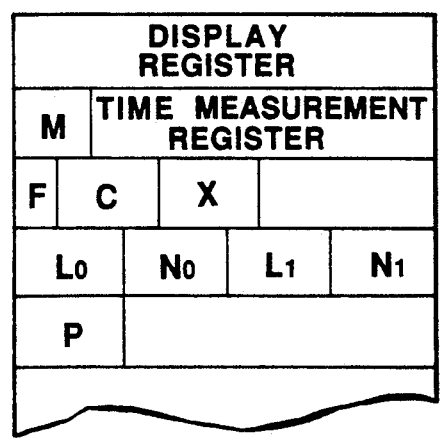
FIG. 10B shows the configuration of a RAM which can be used in place of the RAM shown in FIG. 3B.

In the above embodiment, the declination data table of the ROM 11 is not limited to the one shown in FIG. 3A. As is shown in FIG. 10A, the declination data table may list place names, instead of the longitude and latitude data, so as to permit the user to designate the name of the place where the wristwatch is used. In the case where the declination data table shown in FIG. 10A is used, the RAM 15 is designed to have such a configuration as is shown in FIG. 10B. As is shown, register X is used, in place of registers D0 and D1 shown in FIG. 3A. Register X stores data regarding various place names on the earth, and the user selects one place name corresponding to the place where the wristwatch is used by operating an appropriate switch. In response to the selection of a place name, the corresponding declination data is read out of the ROM 11, for correction.

The second embodiment of the present invention will now be described, with reference to FIGS. 11 through FIG. 19 of the accompanying drawings.

Figure 11:
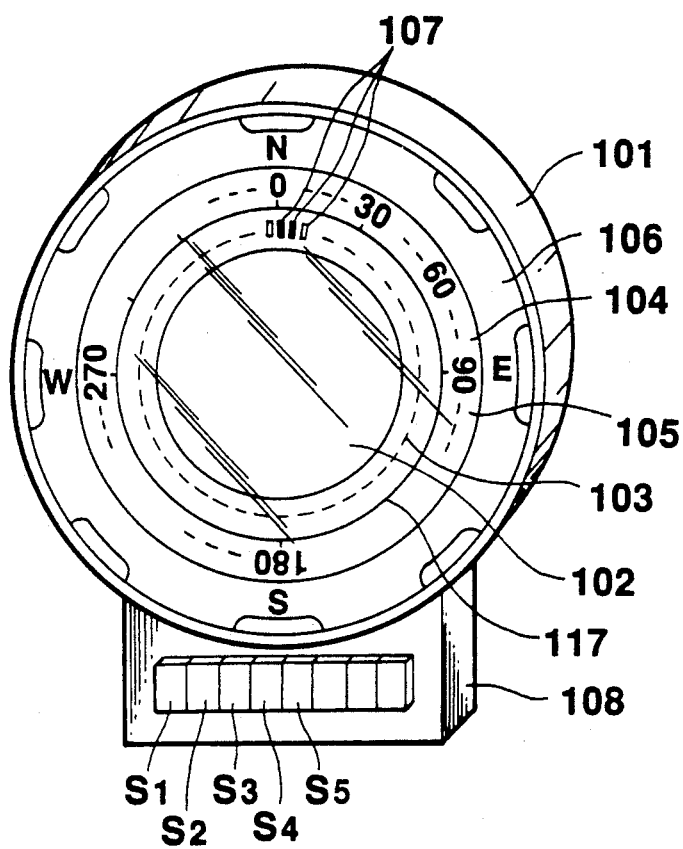
FIG. 11 shows an outward appearance of a digital clock obtained in accordance with the second embodiment of the present invention.

FIG. 11 shows an outward appearance of a digital clock in which a compass according to the present invention is incorporated. As is shown in FIG. 11, the digital clock includes: a main body 101; a circular dot matrix display section 102 located in the center of the front portion of the main body 101; a liquid crystal display section 117 located around the dot matrix display section 102 and having an annular display portion 103; a face (dial) 104 located around the liquid crystal display section 117; a glass cover 105 which covers the dot matrix display section 102, the annular display portion 103 and the face 104; and a bezel 106 located around the glass cover 105.

A plurality of display elements 107 (the number of which is 120, for example), used for indicating an azimuth or a direction, are arranged at equal intervals on the annular display section 103. Azimuth marks are printed on the face 104 clockwise. More specifically, azimuth angles are printed on the face 104, together with divisions, such that "0" is at the twelve-o'clock position, "30" is at the one-o'clock position, "60" is at the two-o'clock position, "90" is at the three-o'clock position, and in like manner. Direction-pointing symbols "N", "E", "S" and "W" are printed on the bezel 106, such that "N" is at the twelve-o'clock position, "E" is at the three-o'clock position, "S" is at the six-o'clock position, and "W" is at the nine-o'clock position. The main body 101 of the digital clock is mounted on a support base 108. On the front face of this support base 108, a plurality of switches S1, S2, S3 . . . are provided. These switches are used for changing display modes, for entering data on a constellation observation point to the clock, or for other purposes.

Figure 12:
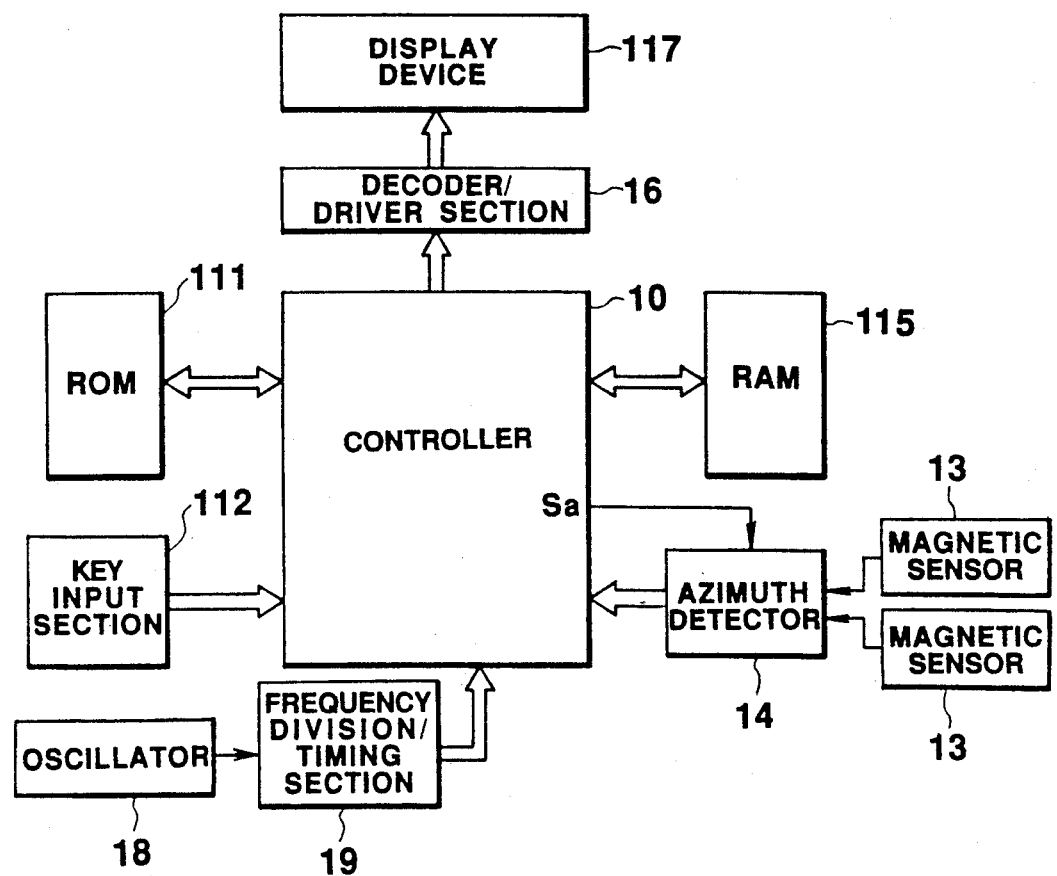
FIG. 12 is a block circuit diagram illustrating the internal circuit of the digital clock shown in FIG. 11.

FIG. 12 is a block circuit diagram illustrating the internal circuit of the clock shown in FIG. 11.

The internal circuit shown in FIG. 12 is substantially similar to that shown in FIG. 2, except for a ROM 111, a key input section 112, a RAM 115 and the above-mentioned display section 117 In the description below, therefore, reference will be made only to those structural components which differentiate the FIG. 12 circuit from the FIG. 2 circuit. The structural components which are similar to those shown in FIG. 2 will be referred to by the same reference numerals or symbols, and explanation of them will be omitted herein.

Referring to FIG. 12, a ROM 111 stores a microprogram with which to control the system, numeric data used for various arithmetic operations, and a declination data table, such as that shown in FIG. 3A. The ROM 111 also stores star data which represents the positional relationships between stars by using a data format corresponding to actual constellations. For example, "1" is set to those bits of the star data which correspond to the positions of stars, and "0" is set to the other bits of the star data. The key input section 112 is provided with the switches S1, S2, S3 . . . explained above with reference to FIG. 11, and signals entered through these switches are supplied to a controller 10.

Figure 13:
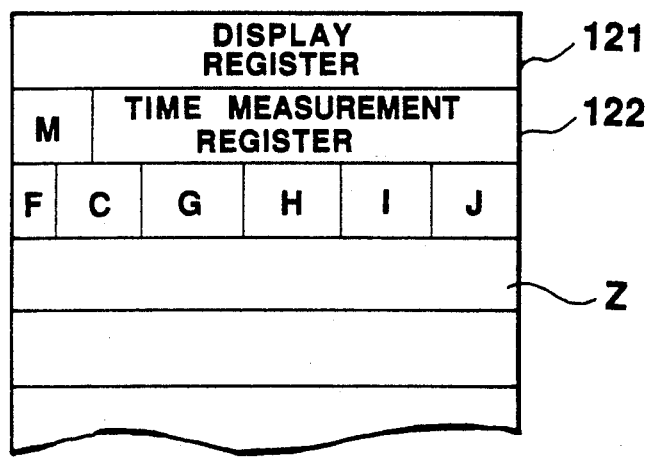
FIG. 13 shows the configuration of the major portions of the RAM shown in FIG. 12.

A RAM (random access memory) 115 contains a plurality of registers for storing predetermined data, as is shown in FIG. 13.

Referring to FIG. 13, a display register 121 stores data which is to be indicated on the dot matrix display section 102 (FIG. 11) and data to be indicated by use of the display elements 107. A time measurement register 122 stores data on the present time which is determined on the basis of the time measurement timing signal supplied from a frequency division/timing section 19. Register M is a mode flag which takes one of three values "0", "1" and "2" corresponding to the three display modes (namely, a time display mode, an azimuth display mode, and a constellation display mode), respectively. Register F is a flag which takes value "1" when the clock is in a mode for adjusting the time or for setting data on the latitude or longitude. Register C is a register used for designating the data which is to be adjusted, altered, or set. Register G stores geographical latitude data entered beforehand. Register H stores geographical longitude data also entered beforehand. Register I stores true-north azimuthal data which is obtained by correcting the data detected by an azimuth detector 14 in accordance with declination data. Register J stores azimuthal data which is obtained by the correction and which corresponds to the twelve-o'clock position of the clock. Register Z is a work area.

A operation which is performed under the control of the controller 10 will now be described, with reference to the flowcharts shown in FIGS. 14 and 15.

Figure 14:
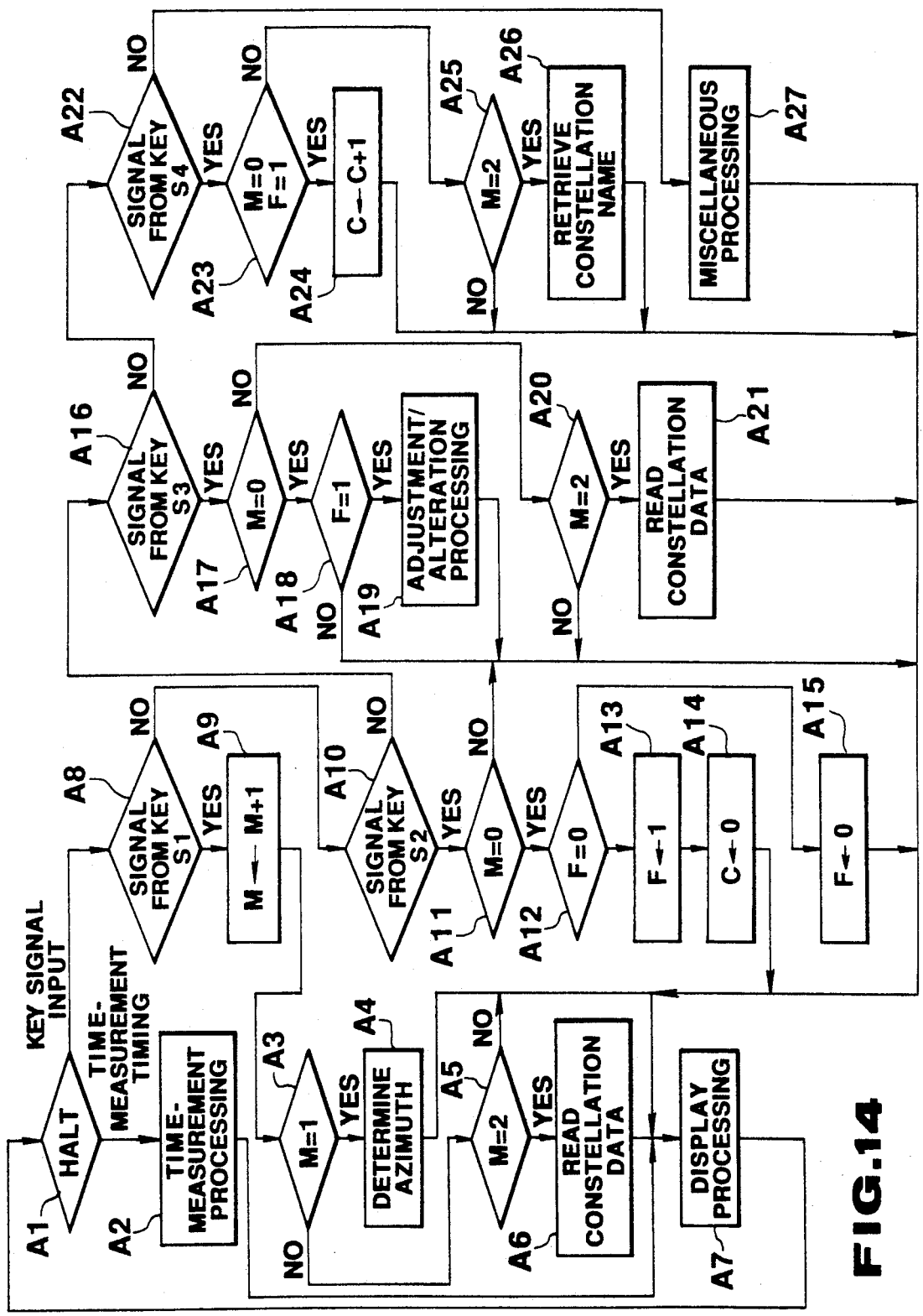
FIG. 14 is a flowchart illustrating the entire program used for controlling the circuit shown in FIG. 11.

FIG. 14 is a flowchart illustrating the entire program. Step A1 indicates a HALT state. Unless a signal is entered from the key input section 112, the flow advances to step A2. In this step A2, the controller 10 executes time-measurement processing on the basis of the time measurement timing signal supplied from the frequency division/timing section 19. The present-time data obtained by this processing is stored in the time measurement register 122 of the RAM 115. Then, the flow advances to step A7, wherein a predetermined display operation is performed. After the display operation, the flow returns to step A1. If, in step A1, a signal is supplied from the key input section 12, then the flow advances to step A8. In this step A8, a check is made to see whether or not the signal is a signal entered by switch S1. (By means of this switch, the three display modes are switched from one to another in a cycle.) If it is determined that the signal is entered by switch S1, then the flow advances to step A9. In this step A9, "1" is added to the value stored in register M, so as to establish the next mode. After this, the flow advances to step A3, wherein a check is made to see whether or not the value of register M is "1", which value corresponds to the azimuth display mode. If it is determined in step A3 that the value of register M is not "1", then the flow advances to step A5 to check whether or not the value of register M is "2", which value corresponds to the constellation display mode. If it is determined in step A5 that the value of register M is not "2", it follows that the value of register M is "0" corresponding to the time display mode. Therefore, the flow jumps to step A7, wherein the present time is displayed, and then returns to step A1.

Figure 16:
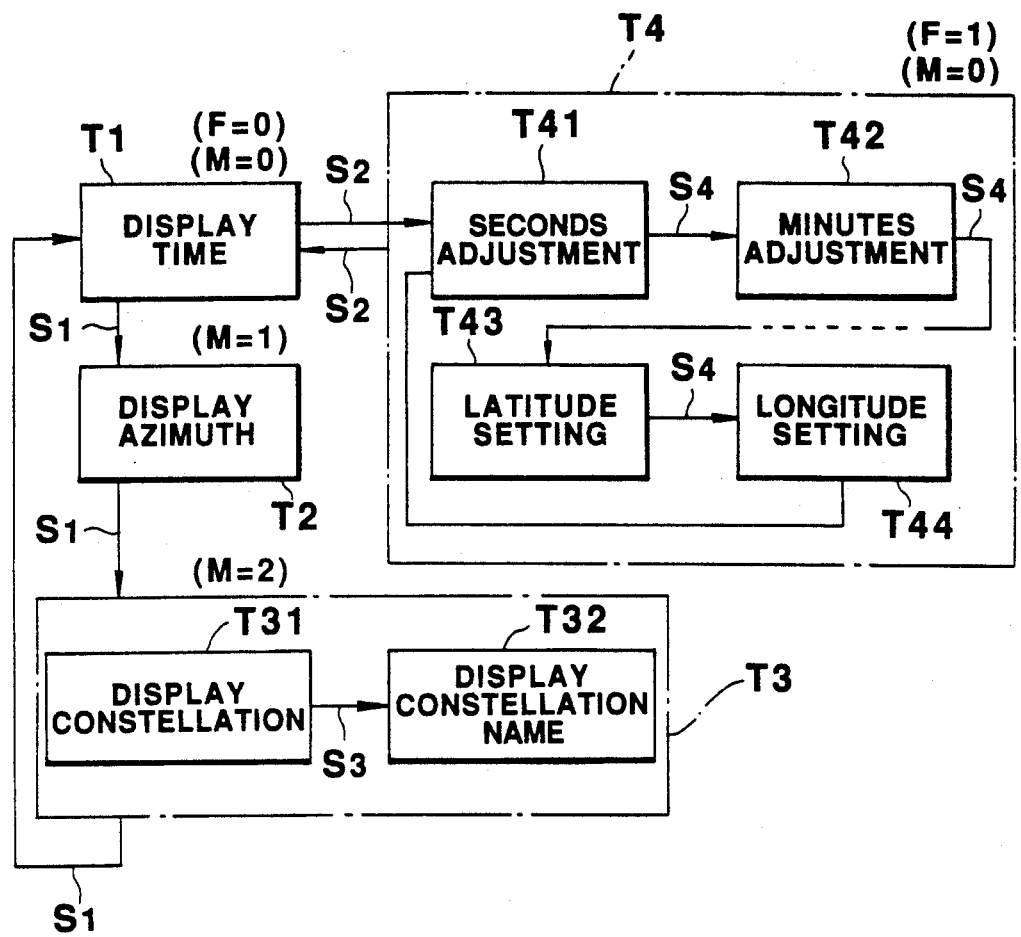
FIG. 16 shows operating modes.
Figure 17:
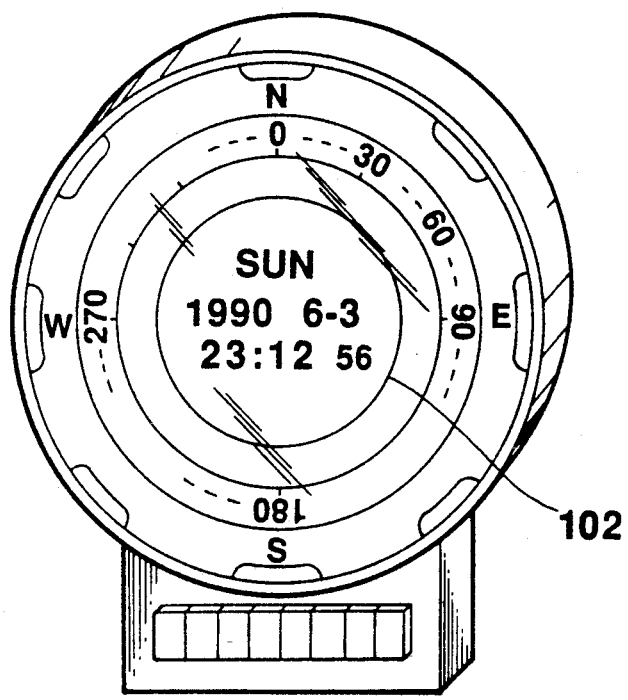
FIG. 17 shows how time is indicated by the clock shown in FIG. 11.
Figure 18:
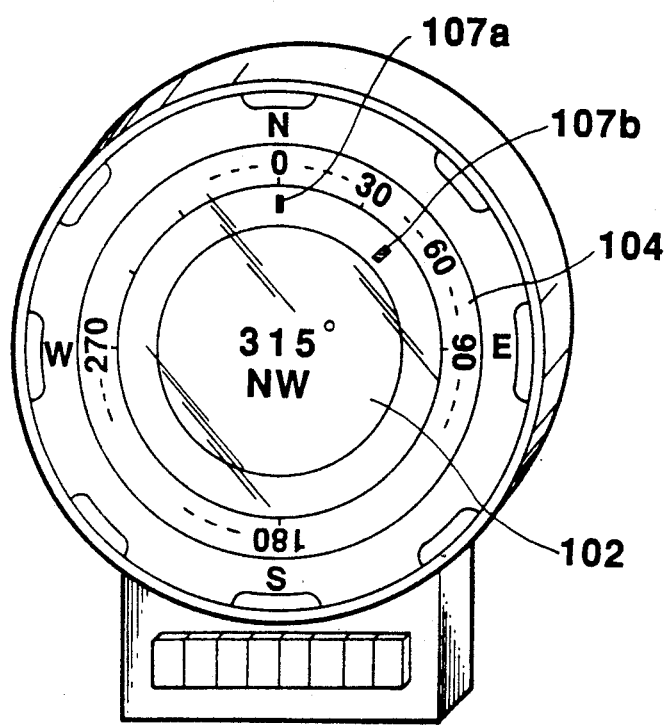
FIG. 18 shows how azimuth is indicated by the clock shown in FIG. 11.
Figure 19:
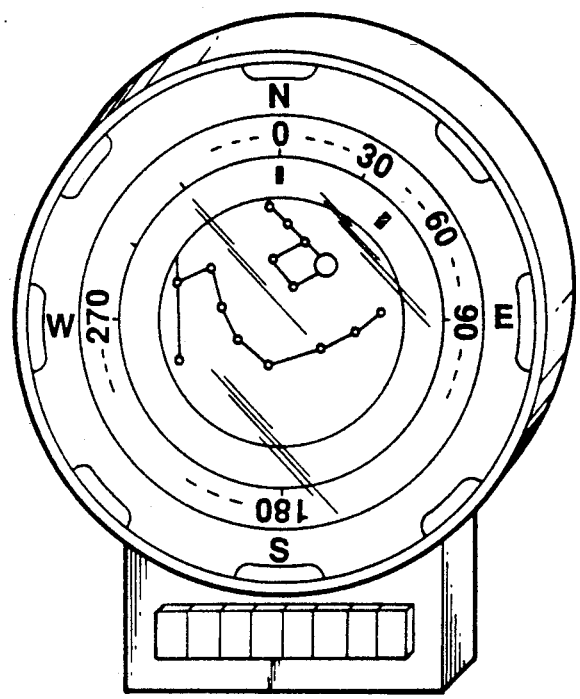
FIG. 19 shows how a constellation is indicated by the clock shown in FIG. 11.

FIG. 16 shows operating modes which can be established one after another in response to the operation of switches. In FIG. 16, "T1" denotes a time display mode which is established when the value of register M is 0. When the clock is in this mode, the present time is read out of the time measurement register 122 of the RAM 115 and indicated on the dot matrix display section 102. An example of present time indication is shown in FIG. 17, wherein the present time (23:12.56) is indicated together with the present date (the 12th of June, Monday). When switch S1 is operated in the time display mode, "1" added to the value of register M in step A9, so that the azimuth display mode indicated by T2 in FIG. 16 is established in place of the time display mode. In this azimuth display mode, the display element 107a arranged at the twelve-o'clock position blinks, and the related azimuthal data (e.g., "315°" and "NW") is shown on the dot matrix display section 2. Further, the display element 107b corresponding to the azimuthal north is lit. When switch S1 is operated in the azimuth display mode, "1" is added to the value of register M in step A9. As a result, the value of register M is changed from "1" to "2", so that the constellation display mode indicated by T3 in FIG. 16 is established. In this constellation display mode, the constellation corresponding to the twelve-o'clock direction of the clock is shown on the dot matrix display section 102, as is shown in FIG. 19, with the display element 107 corresponding to that direction being lit and with the display element 107 corresponding to the north direction blinking. The name of the constellation is shown on the dot matrix display section 102 in response to the operation of switch S4 (which will be mentioned later). If switch S1 is operated in the constellation display mode, "1" is added to the value of register M in step A9, so that register M is reset and takes value "0". Accordingly, the clock is brought back into the time display mode.

Turning back to FIG. 14, if it is determined in step A3 that the value of register M is "1", the flow advances to step A4. In this step A4, the controller 10 drives the azimuth detector 14 by outputting signal Sa, to thereby determine the geomagnetic North Pole. As in the first embodiment, the data on the geomagnetic North Pole is corrected in accordance with the related declination data, to thereby obtain data on the true north direction. The data on the true north direction is stored in register I. Further, an azimuthal operation is carried out on the basis of the data on the true north direction. By this operation, the azimuthal angle data corresponding to the twelve-o'clock position of the clock and the related azimuthal data are stored in register J. Subsequently, the flow advances to step A7, for the execution of the azimuth display processing indicated by T2 in FIG. 16. After this, the flow returns to step A1.

If it is determined in step A5 that the value of register M is "2", then the flow advances to step A6, so as to carry out constellation-retrieving processing. The details of this processing will be described, with reference to the flowchart shown in FIG. 15.

Figure 15:
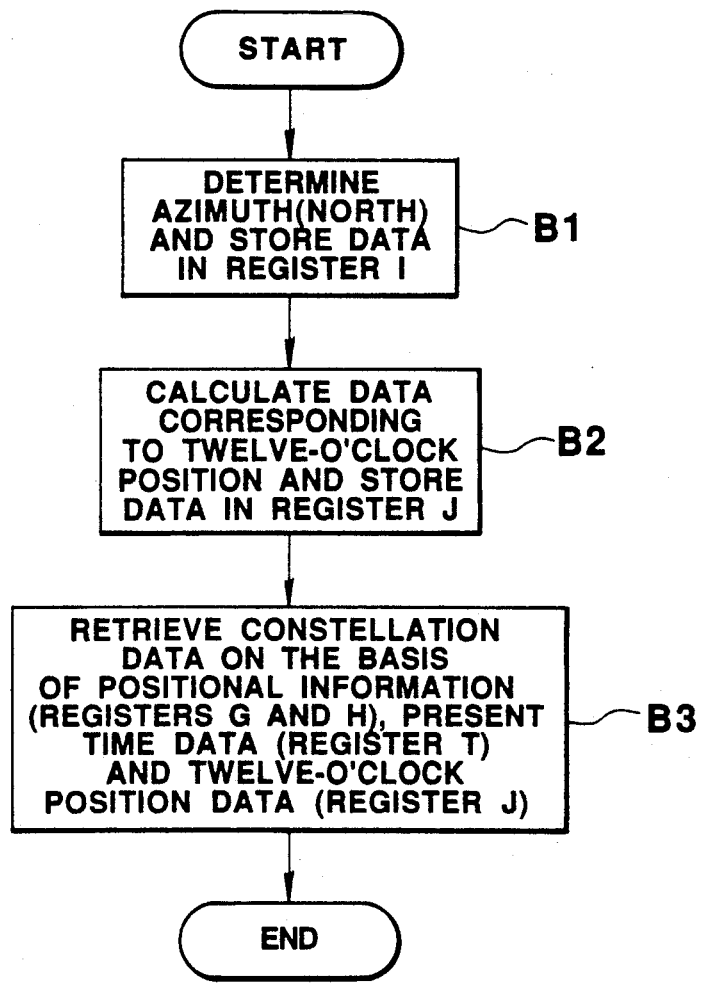
FIG. 15 is a flowchart illustrating a display operation in detail, the display operation corresponding to step A8 indicated in the flowchart shown in FIG. 14.

In step B1 shown in FIG. 15, the controller 10 drives the azimuth detector 14 by outputting signal Sa, to thereby determine the geomagnetic North Pole. The data on the geomagnetic North Pole is corrected in accordance with the related declination data, to thereby obtain data on the true north direction. The data on the true north direction is stored in register I. In the next B2, an azimuthal operation is carried out on the basis of the data on the true north direction, so as to obtain data corresponding to the twelve-o'clock position of the clock. The data, thus obtained, is stored in register J. In step B3, the preset positional information (namely, longitude data and latitude data) is read out of registers G and H, the data on the present date and time is read out of the time measurement register 122, and the azimuthal data corresponding to the twelve-o'clock position of the clock is read out of register J. On the basis of the readout data, the information regarding that constellation which can be observed in the direction of the twelve-o'clock position at the present time is retrieved from the ROM 11, and is then stored in register Z (i.e., a work area).

After the above constellation-retrieving processing (step A6), the constellation information stored in the work area Z is displayed in step A7. This display operation is indicated by T3 in FIG. 16. Thereafter, the flow returns to step A1.

If it is determined in step A8 that the signal supplied to the controller 10 is not entered by switch S1, then the flow advances to step A10. In this step A10, a check is made to see whether or not the signal is entered by switch S2 (by means of which the time display mode and the adjustment/setting mode are alternated with each other.) If it is determined that the signal is entered by switch S2, the flow advances to step A11, to check whether or not the value of register M is "0". If the value of register M is "0", the clock is either in the time display mode indicated by T1 in FIG. 16 or in the adjustment/setting mode indicated by T4 in FIG. 16. In this case, the flow advances to step A12. In this step A12, a check is made to see whether or not the value of register F is "0". If the value of register F is "0", it follows that the clock is in the time display mode. In this case, steps A13 and A14 are successively executed. In step A13, "1" is set to register F to switch the clock from the time display mode to the adjustment/setting mode, and in step A13, "0" is set to register C to initialize the adjustment/setting mode. As a result, the seconds adjustment mode C41, which is the first mode involved in the adjustment/setting mode (indicated by T4 in FIG. 16), is established, and the data which can be adjusted or altered in response to the operation of switch S3 is made to blink. Thereafter, the flow advances to step A7, wherein the blinking data is displayed.

When the value of register F is "1", the clock is in the adjustment/setting mode which is indicated by T4 in FIG. 16. This adjustment/setting mode is made up of a seconds adjustment mode T41, a minutes adjustment mode T42, a latitude-setting mode T43, and a longitude-setting mode T44. These modes are switched from one to another in response to the operation of switch S4. When the wristwatch is in each of these modes, the data which can be adjusted or altered in response to the operation of switch S3 (which will be mentioned later) blinks. After suitable adjustment or alteration is made by use of switch S3, switch S2 is operated again to bring the wristwatch back into the time display mode.

Turning back to FIG. 14, if it is determined in step A12 that the value of register F is not "0", it follows that the value of that register F is "1". In this case, the flow jumps to step A15, wherein "0" is set to register F to thereby cancel the adjustment/setting mode (T4 in FIG. 16). Then, the flow advances to step A7, wherein the present time is displayed (T1 in FIG. 16). Thereafter, the flow returns to step A1. If it is determined in step A11 that the value of register M is not "0", then the signal entered by switch S2 is treated as being invalid, and the flow advances quickly to step A7.

If it is determined in step A10 that the signal supplied to the controller 10 is not entered from switch S2, then step A16 is executed, so as to check whether or not the signal is entered by switch S3. If it is determined in step A16 that the signal is entered by switch S3, the flow advances to step A17, wherein a check is made to see whether or not the value of register M is "0". If the value of register M is "0", then the flow advances to step A18, wherein a check is made to see whether or not the value of register F is "1". If the value of register F is "1", it follows that the clock is in the adjustment/setting mode indicated by T4 in FIG. 16. In this case, therefore, the flow advances to step A19, wherein the time and the latitude and longitude data are adjusted or altered with a increment of +1. Thereafter, step A7 is executed, so as to display the time and the latitude and longitude data. After this display operation, the flow returns to step A1. If it is determined in step A17 that the value of register M is not "0", then the flow advances to step A20, wherein a check is made to see whether or not the value of register M is "2". If the value of register M is "2", the flow advances to step A21, wherein the constellation-retrieving processing is carried out in the manner explained above with reference to FIG. 15. Thereafter, the flow returns to step A1. If it is determined in step A20 that the value of register M is not "2", the signal entered from switch S3 is treated as being invalid. In this case, the flow advances quickly to step A7, for a predetermined display operation, and then returns to step A1.

If it is determined in step A16 that the signal supplied to the controller 10 is entered from switch S3, then the flow advances to step A22, so as to determine whether or not the signal is entered from switch S4. If the signal is entered from switch S4, the flow advances to step A23, wherein a check is made to see whether or not the values of registers M and F are "0" and "1", respectively. If the value of register M is "0" and simultaneously the value of register F is "1", it follows that the clock is in the adjustment/setting mode indicated by T4 in FIG. 16. In this case, therefore, the flow advances to step A24, wherein "1" is added to the value of register C, and the present time data and the longitude and latitude data are adjusted or altered. If the value of register M is not "0" or the value of register F is not "1", step A25 is executed, wherein a check is made to see whether or not the value of register M is "2". If the value of register M is "2", the flow advances to step A26, wherein data on a constellation name is retrieved from the ROM 111. After the data on the constellation name is displayed in step A7, the flow returns to step A1. If it is determined in step A25 that the value of register M is not "2", the signal entered from switch S4 is treated as being invalid. In this case, the flow advances immediately to step A7, for the execution of predetermined display processing, and then returns to step A1. If it is determined in step A22 that the signal supplied to the controller 10 is not a signal entered by switch S4, the flow jumps to step A27. In this step A27, modes such as an alarm mode and a stopwatch mode are established or canceled. Thereafter, the flow returns to step A1.

According to the second embodiment mentioned above, the clock is first placed such that its twelve-o'clock position points to a given region, and then the switches of the clock are operated. With this simple operation, the clock displays not only the constellation existing in that given region but also the name of the constellation.

In the second embodiment mentioned above, latitude data and longitude data are used as information representing positions on the globe. However, the latitude and longitude data may be replaced with city data or country data, such as that used in a world clock. Further, the constellation names may be indicated not only in Japanese but also in English, or any other language.

Although not shown in the flowchart in FIG. 14, the clock of the second embodiment may be designed to display a constellation in response to the designation of the corresponding name, and a constellation name in response to the designation of the corresponding constellation. The clock may be also designed to indicate the azimuth and direction in which the constellation exists.

In the second embodiment, the stars may be displayed, with their display areas being changed in accordance with the magnitudes of the stars. Further, each star on the dot matrix display section may be indicated in the form of an asterisk.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A compass comprising:
   a read-only memory for storing declination data which represents magnetic declination relating to a plurality of predetermined terrestrial locations;
   selecting means for selecting one of the predetermined terrestrial locations;
   declination data storing means for reading out from the read-only memory declination data relating to the selected location selected by the selecting means, and for storing the read out declination data;
   geomagnetism-detecting means for detecting the direction of geomagnetism and deriving azimuthal data therefrom;
   first azimuth display means for displaying azimuthal data obtained by the geomagnetism-detecting means;
   correction means for correcting the azimuthal data derived by the geomagnetism-detecting means in accordance with the declination data stored in the declination data storing means, to thereby obtain corrected azimuthal data;
   second azimuth display means for displaying the corrected azimuthal data obtained by the correction means; and
   declination data display means for displaying the declination data that is stored in the declination data storing means and that relates to the selected location.

2. A compass according to claim 1, wherein said selecting means includes a selection switch.

3. A compass according to claim 1, wherein said declination data stored in the read only memory includes declination angle data and declination direction data.

4. A compass according to claim 1, wherein said selecting means includes:
   input means for inputting positional data corresponding to the selected terrestrial location, and said positional data including latitude data and longitudinal data.

5. A compass according to claim 1, wherein said selecting means includes:
   selection switch means for selecting positional data corresponding to the selected terrestrial location from positional data corresponding to a plurality of terrestrial locations, said positional data to be selected by the selection switch means representing cities.

6. A compass according to claim 1, wherein said corrected azimuthal data displayed on the second azimuth display means represents a north point located on a geographical meridian.

7. A compass comprising:
   a casing;
   azimuth indication means for indicating azimuthal angles in a fixed manner, with an angle of 0° at a twelve-o'clock position of the casing;
   first display means for displaying the azimuthal angles indicated by the azimuth indication means;
   a read-only memory for storing declination data which represents magnetic declination relating to a plurality of predetermined terrestrial locations;
   selecting means for selecting one of the predetermined terrestrial locations;
   declination data storage means for reading out from the read-only memory the declination data relating to the selected location selected by the selecting means, and for storing the read-out declination data;
   a second display means for displaying the declination data that is stored in the declination data storing means and that relates to the selected location;
   geomagnetism-detecting means arranged in the casing, for detecting the direction of geomagnetism and for deriving azimuthal data therefrom;
   correction means for correcting the azimuthal data derived by the geomagnetism-detecting means in accordance with the declination data stored in the declination data storage means to thereby obtain north direction data which represents a north point located on a geographical meridian; and
   display control means for causing the first display means to indicate the north direction data obtained by the correction means.

8. A compass according to claim 7, wherein said selecting means includes a selection switch.

9. A compass according to claim 7, wherein said declination data stored in the read only memory includes declination angle data and declination direction data.

10. A compass according to claim 7, wherein said selecting means includes:

input means for inputting positional data corresponding to the selected terrestrial location, and said positional data including latitude data and longitudinal data.

11. A compass according to claim 7, wherein said selecting means includes:

selection switch means for selecting positional data corresponding to the selected terrestrial location from positional data corresponding to a plurality of terrestrial locations, said positional data to be selected by the selection switch means representing cities.

12. A compass according to claim 7, further comprising:

geomagnetic azimuth-displaying means for causing the first display means to display the azimuthal data detected by the geomagnetism-detecting means.

13. A compass according to claim 7, wherein said geomagnetism-detecting means includes two magnetic sensors arranged perpendicular to each other.

* * * * *